United States Patent

Fukumoto et al.

(10) Patent No.: US 9,321,333 B2
(45) Date of Patent: Apr. 26, 2016

(54) SLIDE DOOR APPARATUS FOR VEHICLE

(71) Applicant: AISIN SEIKI KABUSHIKI KAISHA, Kariya-shi (JP)

(72) Inventors: Ryoichi Fukumoto, Nagoya (JP); Tomohide Kato, Toyoake (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 35 days.

(21) Appl. No.: 14/224,765

(22) Filed: Mar. 25, 2014

(65) Prior Publication Data

US 2014/0292038 A1 Oct. 2, 2014

(30) Foreign Application Priority Data

Mar. 27, 2013 (JP) ................................. 2013-066806

(51) Int. Cl.
 *B60J 5/00* (2006.01)
 *B60J 5/06* (2006.01)
(52) U.S. Cl.
 CPC .......................................... *B60J 5/06* (2013.01)
(58) Field of Classification Search
 CPC .................................. B60J 5/06; E05B 77/54
 USPC ....................... 296/155, 202; 49/460; 29/401
 See application file for complete search history.

(56) References Cited

U.S. PATENT DOCUMENTS

| 4,945,677 A * | 8/1990 | Kramer ........................... 49/210 |
| 7,008,514 B2 * | 3/2006 | Matsumura et al. ........... 196/155 |
| 7,159,930 B2 * | 1/2007 | Yokomori et al. ............. 296/155 |
| 2013/0020567 A1 | 1/2013 | Lee et al. |

FOREIGN PATENT DOCUMENTS

| EP | 1362730 A1 | 11/2003 |
| JP | 2003-335136 A | 11/2003 |

* cited by examiner

*Primary Examiner* — Joseph D Pape
*Assistant Examiner* — Dana Ivey
(74) *Attorney, Agent, or Firm* — Buchanan Ingersoll & Rooney PC

(57) ABSTRACT

A slide door apparatus includes a body-side guide rail provided at a vehicle body, a door-side guide rail provided at a slide door, connection members each of which includes a guide roller rolling on a path formed by each of the guide rails, each of the connection members being connected to each of the guide rails, the slide door being configured to open and close a door opening portion formed at the vehicle body based on a movement of the slide door, one of the connection members being connected to the door-side guide rail and including a support arm which is rotatably connected to the vehicle body and at which the guide roller is provided, and a rotation restriction mechanism restricting the support arm from rotating at a position at which the support arm is positioned after rotating in association with an opening operation of the slide door.

13 Claims, 14 Drawing Sheets

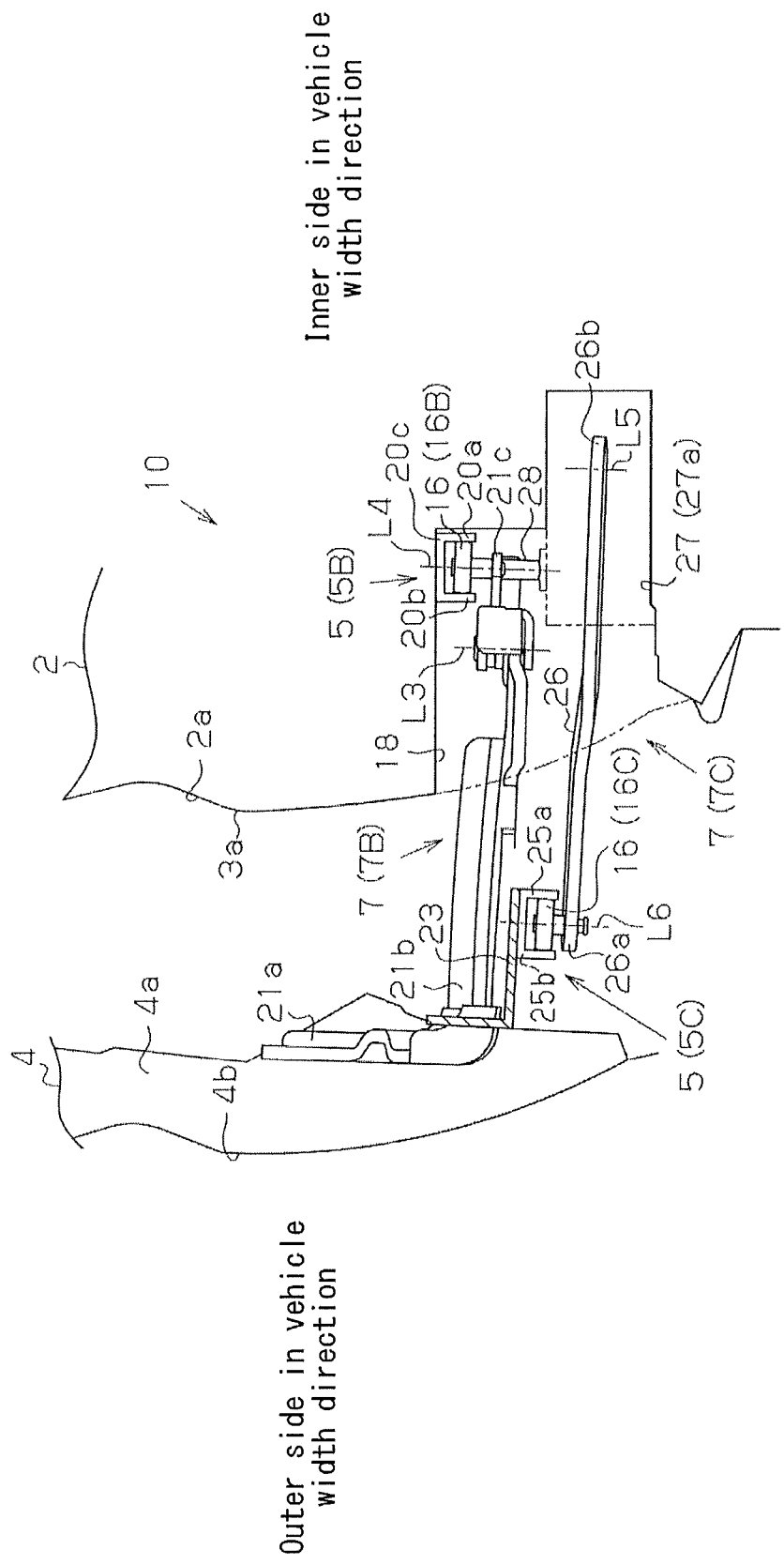

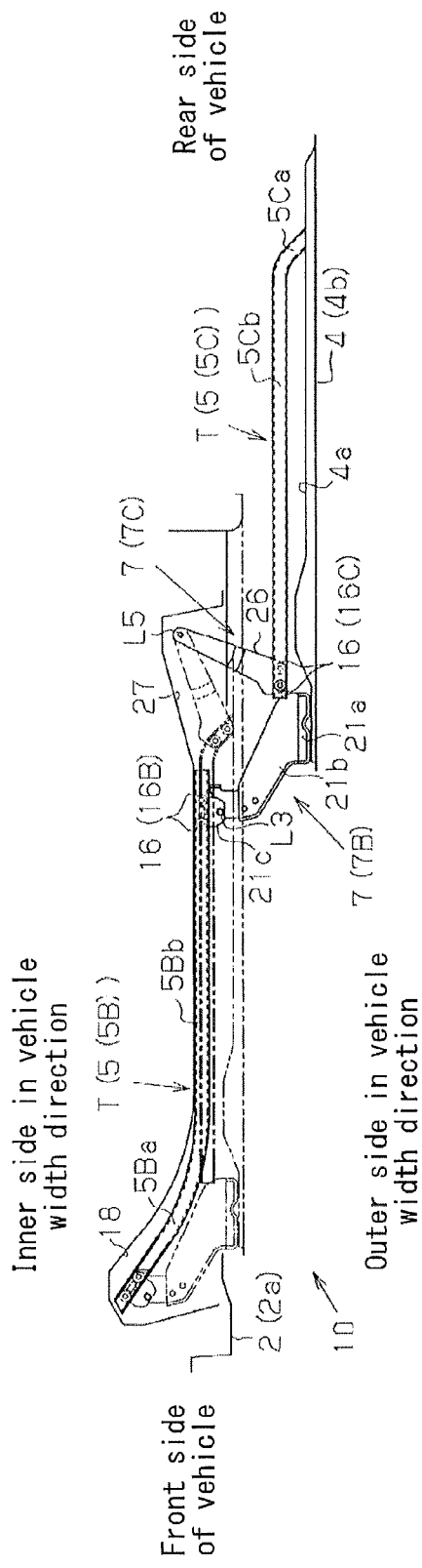
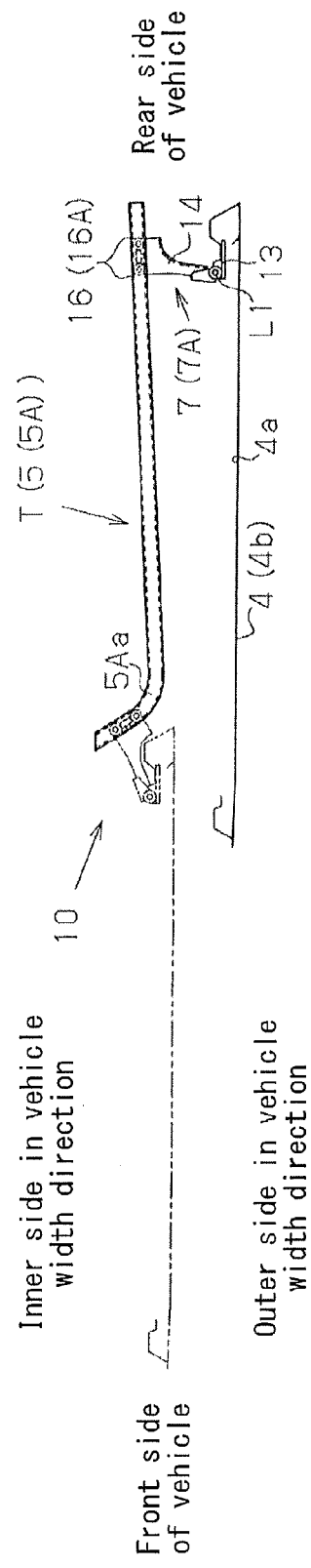
FIG. 4A
FIG. 4B

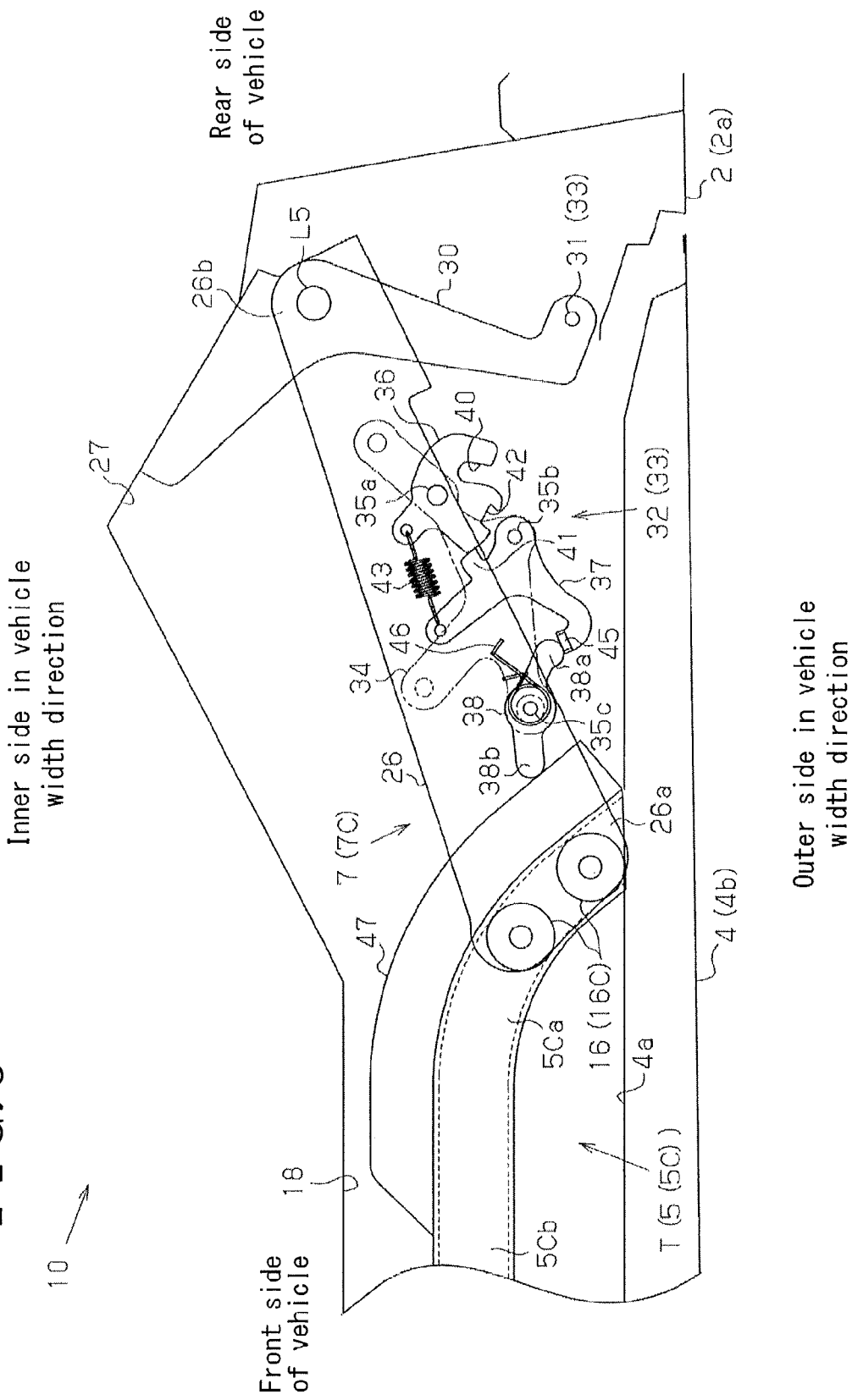

F I G. 15
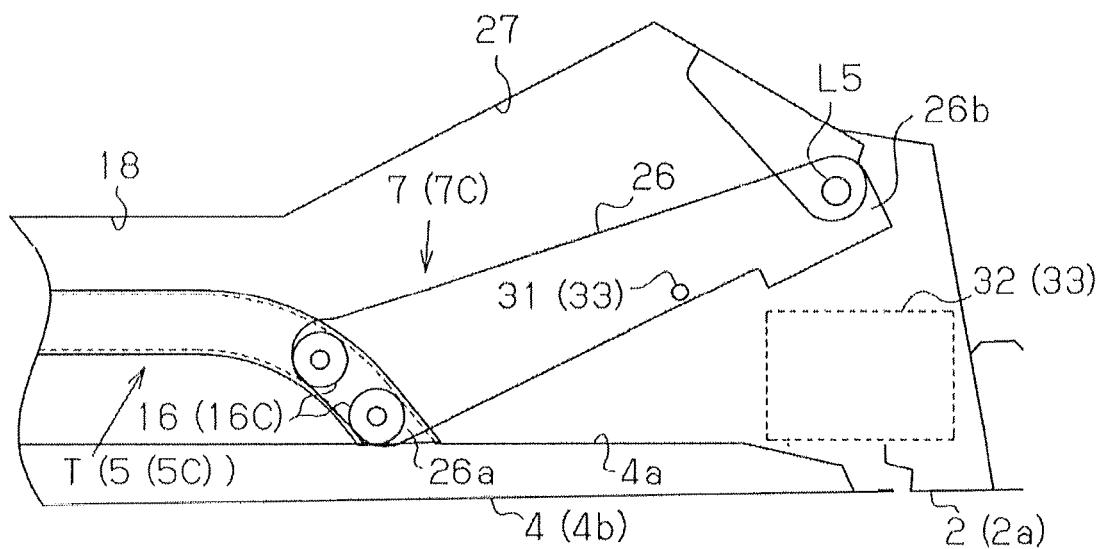

F I G. 16
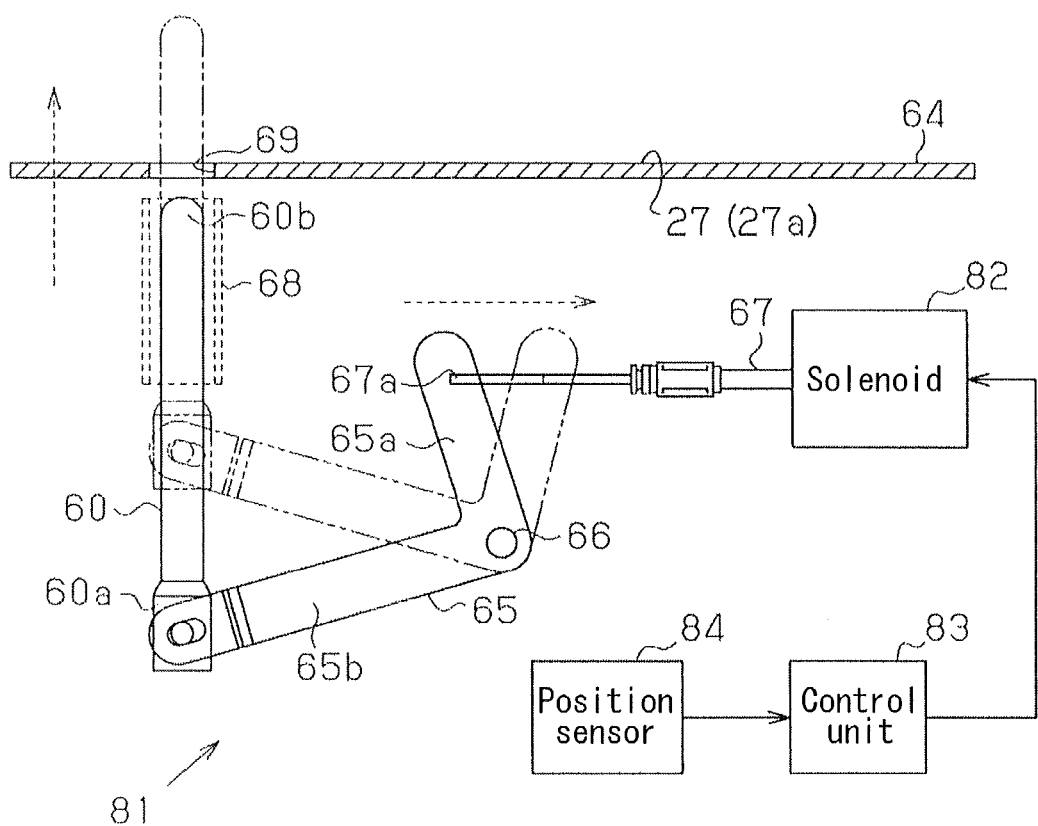

SLIDE DOOR APPARATUS FOR VEHICLE

CROSS REFERENCE TO RELATED APPLICATIONS

This application is based on and claims priority under 35 U.S.C. §119 to Japanese Patent Application 2013-066806, filed on Mar. 27, 2013, the entire content of which is incorporated herein by reference.

TECHNICAL FIELD

This disclosure generally relates to a slide door apparatus for a vehicle.

BACKGROUND DISCUSSION

A known slide door apparatus for a vehicle includes a guide rail extending in a front-rear direction, i.e., a longitudinal direction, of a vehicle and a connection member including a guide roller that is configured to roll on a path formed by the guide rail. A slide door is supported at a vehicle body via the guide rail and the connection member so as to open and close a door opening portion of the vehicle formed at a side surface of the vehicle body based on a longitudinal movement of the slide door along the guide rail.

In addition, the aforementioned guide rail may include a body-side guide rail formed at the side surface of the vehicle body and a door-side guide rail formed at an inner side surface of the slide door.

For example, a slide door apparatus for a vehicle disclosed in JP2003-335136A, which will be hereinafter referred to as Reference 1, includes a first body-side guide rail at a lower position than a window portion of the vehicle formed by the slide door, and a second body-side guide rail at a lower edge of the door opening portion. The slide door apparatus further includes first and second door-side guide rails at positions facing the first and second body-side guide rails.

The guide rail is normally formed at the vehicle body, however, the guide rail is also formed at the inner side surface of the slide door to improve arrangement flexibility of the guide rail and the connection member connected thereto. As a result, according to the slide door apparatus disclosed in Reference 1, a window frame of a window glass forming the window portion may be omitted.

According to the slide door apparatus disclosed in Reference 1, however, a possibility of decrease in rigidity for supporting the slide door (i.e., support rigidity) caused by arrangement change of the guide rail may not be fully eliminated. Such decrease of support rigidity become noticeable as swing or shaky movement of the slide door, which may lead to decrease in quality feeling of the slide door apparatus.

A need thus exists for a slide door apparatus for a vehicle which is not susceptible to the drawback mentioned above.

SUMMARY

According to an aspect of this disclosure, a slide apparatus for a vehicle includes a body-side guide rail provided at a side surface of a vehicle body, a door-side guide rail provided at a slide door, connection members each of which includes a guide roller rolling on a path formed by each of the body-side guide rail and the door-side guide rail, each of the connection members being connected to each of the body-side guide rail and the door-side guide rail, the slide door being supported at the vehicle body via the body-side guide rail, the door-side guide rail, and the connection members to be configured to open and close a door opening portion formed at the side surface of the vehicle body based on a movement of the slide door in a front-rear direction of a vehicle along each of the body-side guide rail and the door-side guide rail, one of the connection members being connected to the door-side guide rail and including a support arm which is rotatably connected to the vehicle body and at which the guide roller is provided, and a rotation restriction mechanism restricting the support arm from rotating at a position at which the support arm is positioned after rotating in association with an opening operation of the slide door.

BRIEF DESCRIPTION OF THE DRAWINGS

The foregoing and additional features and characteristics of this disclosure will become more apparent from the following detailed description considered with the reference to the accompanying drawings, wherein:

FIG. 3 is cross-sectional view taken along line III-III in FIG. 1 illustrating configurations of a second body-side guide rail, a second door-side connection member, a door-side guide rail, and a body-side connection member;

FIG. 4A is a cross-sectional view taken along line IVA-IVA in FIG. 1 illustrating the configurations of the second body-side guide rail, the second door-side connection member, the door-side guide rail, and the body-side connection member;

FIG. 4B is a cross-sectional view taken along line IVB-IVB in FIG. 1 illustrating the configurations of the first body-side guide rail and the first door-side connection member;

FIG. 5 is a plan view schematically illustrating a configuration of a rotation restriction mechanism in a disengagement state of a striker and a latch mechanism according to the first embodiment;

FIG. 15 is a plan view schematically illustrating a rotation restriction mechanism according to a modified embodiment; and FIG. 16 is a schematic view of an engagement member drive unit according to another modified embodiment.

DETAILED DESCRIPTION

Figure 1:
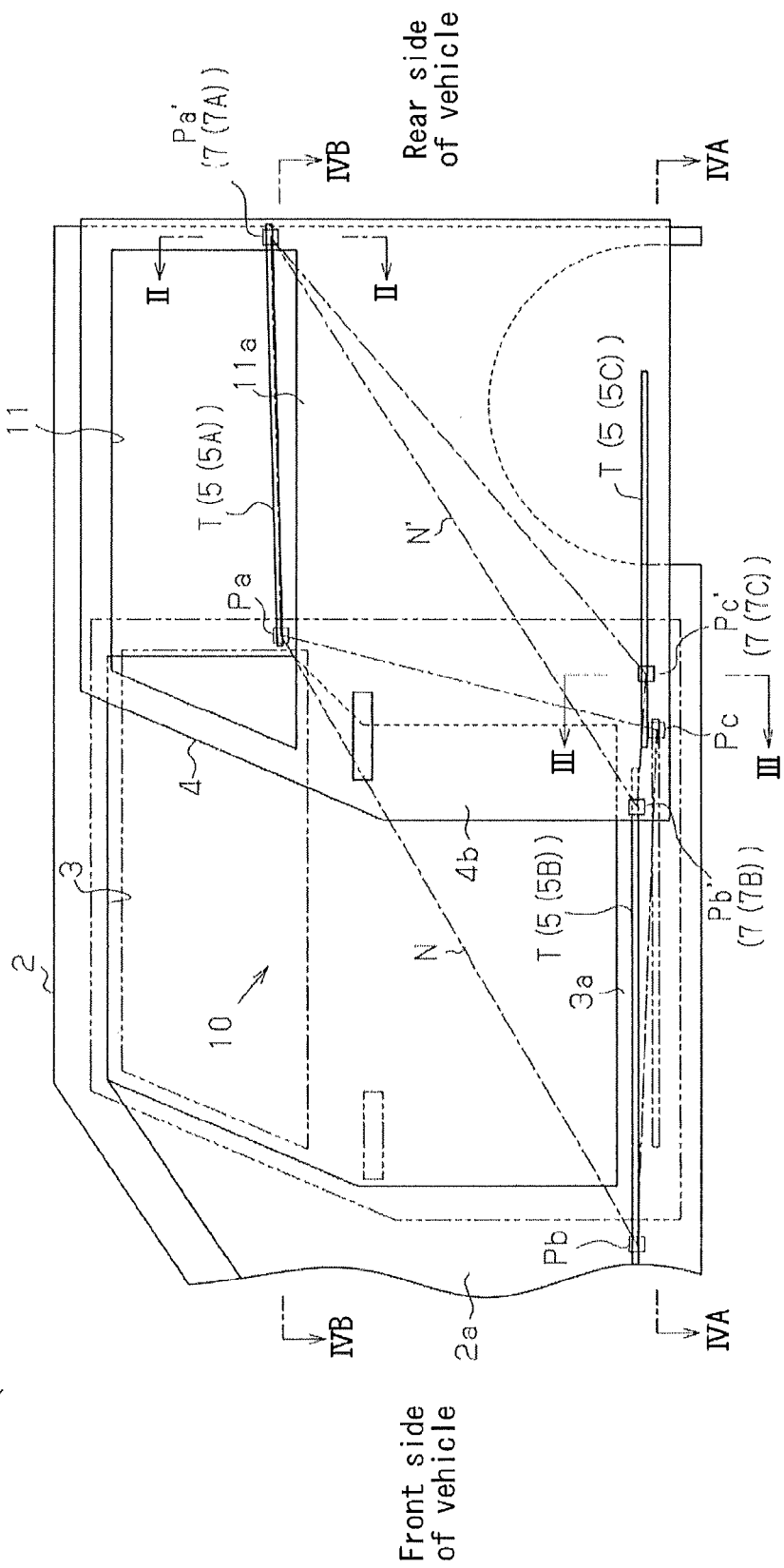
FIG. 1 is a schematic view of a slide door apparatus for a vehicle according to a first embodiment disclosed here.

A slide door apparatus for a vehicle according to a first embodiment will be explained with reference to the attached drawings. As illustrated in FIG. 1, a vehicle 1 includes a slide door 4 that is movable in a front-rear direction of the vehicle 1 to open and close a door opening portion 3 formed at a side surface 2a of a vehicle body 2.

The vehicle 1 is equipped with a slide door apparatus 10 that includes plural guide rails 5 extending in the front-rear direction of the vehicle 1 and connection members 7 connected to the respective guide rails 5 to be relatively movable in a direction where each of the guide rails 5 extends. The slide door 4 is supported at the vehicle body 2 via the guide rails 5 and the connection members 7 so as to open and close the door opening portion 3 formed at the side surface 2a of the vehicle body 2 by moving in the front-rear direction of the vehicle 1.

Specifically, the plural guide rails 5 of the slide door apparatus 10 in the first embodiment are constituted by first and second body-side guide rails 5A and 5B provided at the side surface 2a of the vehicle body 2, and a door-side guide rail 5C provided at an inner side surface 4a of the slide door 4. The connection members 7 of the slide door apparatus 10 in the first embodiment are constituted by first and second door-side connection members 7A and 7B provided at the slide door 4 to be connected to the first and second body-side guide rails 5A and 5B, and a body-side connection member 7C provided at the side surface 2a of the vehicle body 2 to be connected to the door-side guide rail 5C.

In the first embodiment, the first body-side guide rail 5A serving as a center rail is arranged at a rear side of the door opening portion 3 and at a substantially center portion in a vertical direction of the vehicle 1. The second body-side guide rail 5B serving as a body-side lower rail is provided at a lower edge 3a of the door opening portion 3 to be arranged at a lower side of the first body-side guide rail 5A. The door-side guide rail 5C serving as a door-side lower rail is provided at a lower edge portion of the slide door 4 to be arranged at a lower side of the second body-side guide rail 5B.

The first door-side connection member 7A connected to the first body-side guide rail 5A is provided at a position corresponding to a lower edge 11a of a window portion 11 formed by the slide door 4 at a rear end portion of the slide door 4. The second door-side connection member 7B connected to the second body-side guide rail 5B is arranged at a front lower end portion of the slide door 4. The body-side connection member 7C connected to the door-side guide rail 5C is arranged at a position corresponding to a rear end portion of the door opening portion 3 at a lower portion thereof.

Figure 2:
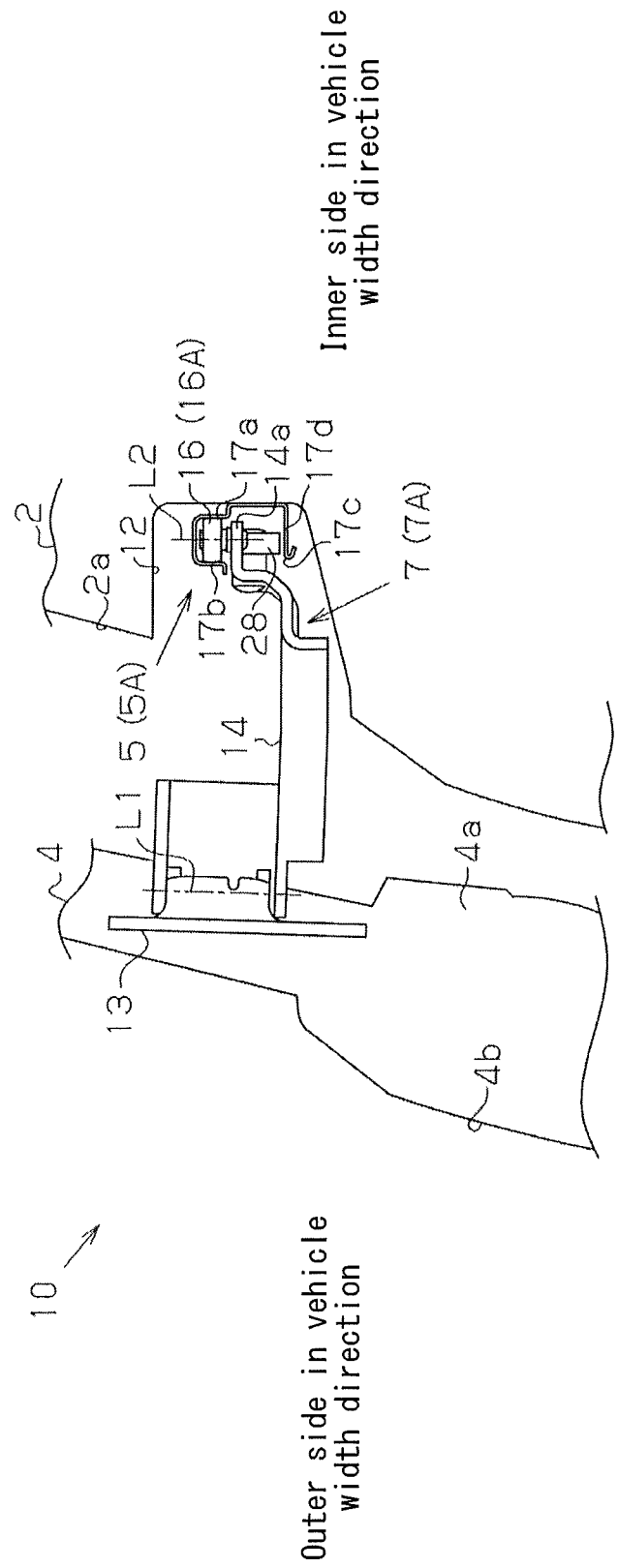
FIG. 2 is a cross-sectional view taken along line II-II in FIG. 1 illustrating configurations of a first body-side guide rail and a first door-side connection member.

Specifically, as illustrated in FIG. 2, the first body-side guide rail 5A is arranged within a recess portion 12 in a groove form. The recess portion 12 is formed at the side surface 2a of the vehicle body 2 so as to extend in the front-rear direction of the vehicle 1 (i.e., in a direction orthogonal to a plane of paper in which FIG. 2 is illustrated). The first door-side connection member 7A connected to the first body-side guide rail 5A includes a bracket 13 fixed to the slide door 4 and a support arm 14 including a support axis L1 that extends in the vertical direction. The support arm 14 is rotatably supported at the bracket 13. A guide roller 16, specifically, a first guide roller 16A is provided at an end portion 14a of the support arm 14 so that the first guide roller 16A is configured to roll on a path T formed by the first body-side guide rail 5A.

The first body-side guide rail 5A includes a pair of side wall portions 17a and 17b opposed in a width direction of the vehicle 1 corresponding to right and left directions in FIG. 2. The first guide roller 16A is rotatably supported at a support axis L2 that extends in the vertical direction. An opening portion 17c is formed at the first body-side guide rail 5A so that the end portion 14a of the support arm 14 may be inserted into the opening portion 17c.

The first door-side connection member 7A is connected to the first body-side guide rail 5A in a state where the first guide roller 16A is sandwiched and disposed between the side wall portions 17a and 17b. The first guide roller 16A makes contact with either the side wall portion 17a or 17b to thereby form the path T at either the side wall portion 17a or 17b. The first door-side connection member 7A is movable along the extending direction of the first body-side guide rail 5A in a state where the first guide roller 16A rolls on the path T.

In addition, as illustrated in FIG. 3, a recess portion 18 in a groove form is formed at the lower edge 3a of the door opening portion 3 so as to extend in the vehicle front-rear direction (i.e., in a direction orthogonal to a plane of paper in which FIG. 3 is illustrated). The second body-side guide rail 5B is arranged within the recess portion 18.

The second body-side guide rail 5B includes a pair of side wall portions 20a and 20b opposed in the width direction of the vehicle 1 corresponding to the right and left directions in FIG. 3. The second body-side guide rail 5B includes a substantially U-shape cross section opening downward. The second door-side connection member 7B connected to the second body-side guide rail 5B includes a fixation portion 21a fixed to the slide door 4 and an arm portion 21b extending inwardly in the width direction of the vehicle 1 (i.e., extending to a right side in FIG. 3). A roller holding portion 21c including a support axis L3 that extends in the vertical direction is rotatably connected to an end of the arm portion 21b. The guide roller 16, specifically, a second guide roller 16B including a support axis L4 that extends in the vertical direction, is provided at the roller holding portion 21c so that the second guide roller 16B is configured to roll on the path T formed by the second body-side guide rail 5B.

The second door-side connection member 7B is connected to the second body-side guide rail 5B in a state where the second guide roller 16B provided at the roller holding portion 21c is sandwiched and disposed between the side wall portions 20a and 20b. The second guide roller 16B rolls on the path T formed at each of the side wall portions 20a and 20b to be movable along the extending direction of the second body-side guide rail 5B.

The door-side guide rail 5C includes a pair of side wall portions 25a and 25b opposed in the width direction of the vehicle 1 so as to include a substantially U-shape cross section opening downward. The door-side guide rail 5C is supported at a bracket 23 that includes a substantially L-shape cross section so that the door-side guide rail 5C is fixed to the inner side surface 4a of the slide door 4.

The body-side connection member 7C connected to the door-side guide rail 5C includes a support arm 26 including a support axis L5 that extends in the vertical direction and being rotatably supported at the vehicle body 2. In the first embodiment, a recess portion 27 is formed at the side surface 2a of the vehicle body 2 at a lower side of the recess portion 18 at which the second body-side guide rail 5B is arranged. The guide roller 16, specifically, a third guide roller 16C including a support axis L6 the extends in the vertical direction, is provided at an end portion 26a of the support arm 26 so that the third guide roller 16C is configured to roll on the path T formed by the door-side guide rail 5C.

The body-side connection member 7C is connected to the door-side guide rail 5C in a state where the third guide roller 16C provided at the end portion 26a of the support arm 26 is sandwiched and disposed between the side wall portions 25a and 25b. The third guide roller 16C rolls on the path T formed at each of the side wall portions 25a and 25b to be apparently movable along the extending direction of the door-side guide rail 5C.

As illustrated in FIGS. 4A and 4B, in the first embodiment, the two guide rollers 16 are provided at each of the connection members 7. In addition, as illustrated in FIG. 2, a road roller 28 is provided at the end portion 14a of the support arm 14 that constitutes the first door-side connection member 7A. The road roller 28 is configured to roll on a lower wall portion 17d of the first body-side guide rail 5A. As illustrated in FIG. 3, the similar road roller 28 is provided at the roller holding portion 21c that constitutes the second door-side connection member 7B. According to the first embodiment, the load of the slide door 4 is supported by the aforementioned road rollers 28.

As mentioned above, the slide door 4 is supported at the vehicle body 2 via the guide rails 5, specifically, the first to third guide rails 5A, 5B, and 5C, and the connection members 7, specifically, the first to third connection members 7A, 7B, and 7C. The slide door apparatus 10 is configured to move the slide door 4 in the front-rear direction of the vehicle 1 by a relative movement between each of the guide rails 5A, 5B, and 5C and each of the connection members 7A, 7B, and 7C in a state where each of the guide rollers 16 rolls.

As illustrated in FIG. 4A, a front portion (i.e., a left end portion in FIG. 4A) of the second body-side guide rail 5B provided at the lower edge 3a (see FIG. 1) of the door opening portion 3 is formed by gently curving inwardly in the width direction of the vehicle 1 (i.e., curving upwardly in FIG. 4A).

Specifically, the slide door 4 is arranged so that an outer side surface 4b thereof is coplanar with the side surface 2a of the vehicle body 2 at a fully closed position of the slide door 4 indicated by a chain double-dashed line in FIG. 4A at which the slide door 4 is positioned at a front side in the vehicle 1 by moving along the curved form of the second body-side guide rail 5B, i.e., moving along a curved portion 5Ba thereof. In a case where the slide door 4 moves to a rear side in the vehicle 1 by an opening operation, i.e., to be positioned at a fully open position illustrated by a solid line in FIG. 4A, the slide door 4 is arranged at an outer side in the width direction of the vehicle 1 (i.e., at a lower side in FIG. 4A) so as not to interfere with the side surface 2a of the vehicle body 2.

As illustrated in FIG. 4B, because of dimensional restrictions, it may be difficult to provide a curved form, as gentle as the curved form of the second body-side guide rail 5B, to the first body-side guide rail 5A arranged in the rear of the door opening portion 3. Specifically, a curved portion 5Aa formed at the first body-side guide rail 5A is not as gentle as the curved portion 5Ba of the second body-side guide rail 5B.

In addition, as illustrated in FIG. 4A, a rear portion (i.e., a right end portion in FIG. 4A) of the door-side guide rail 5C may be desired to gently curve outwardly in the width direction (i.e., downwardly in FIG. 4A) in the same way as the curved portion 5Ba of the second body-side guide rail 5B. Nevertheless, because of dimensional restrictions, it may be difficult to provide a curved form, in the same way as the curved portion 5Ba, to the door-side guide rail 5C. Specifically, a curved portion 5Ca formed at the door-side guide rail 5C is not as gentle as the curved portion 5Ba of the second body-side guide rail 5B.

Therefore, according to the first embodiment, the support arm 14 that is pivotally supported by the support axis L1 extending in the vertical direction is provided at the first door-side connection member 7A connected to the first body-side guide rail 5A. In the same way, the support arm 26 that is pivotally supported by the support axis L5 extending in the vertical direction is provided at the body-side connection member 7C connected to the door-side guide rail 5C. Then, in the first embodiment, at the time of the opening and closing operation of the slide door 4, the support arms 14 and 26 rotate on a basis of a moving position of the slide door 4 so that a displacement of the slide door 4 is allowed in the width direction of the vehicle 1 based on the curved form, i.e., the curved portion 5Ba, of the second body-side guide rail 5B.

Next, a mechanism of restricting the rotation of the support arm (i.e., a rotation restriction mechanism) provided at the slide door apparatus according to the first embodiment will be explained.

Figure 6:
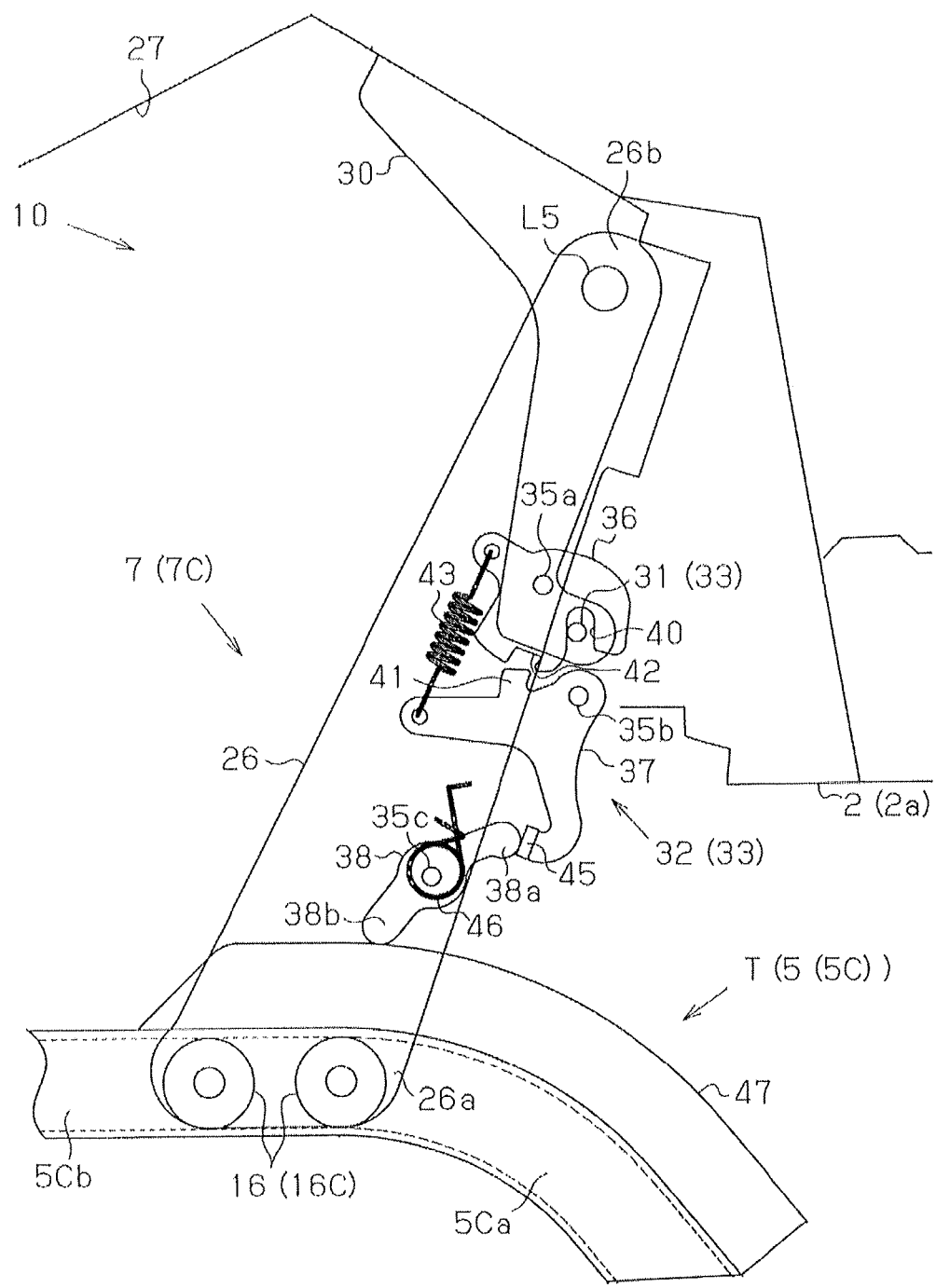
FIG. 6 is a plan view schematically illustrating the configuration of the rotation restriction mechanism in a shifting state of the striker and the latch mechanism according to the first embodiment.
Figure 7:
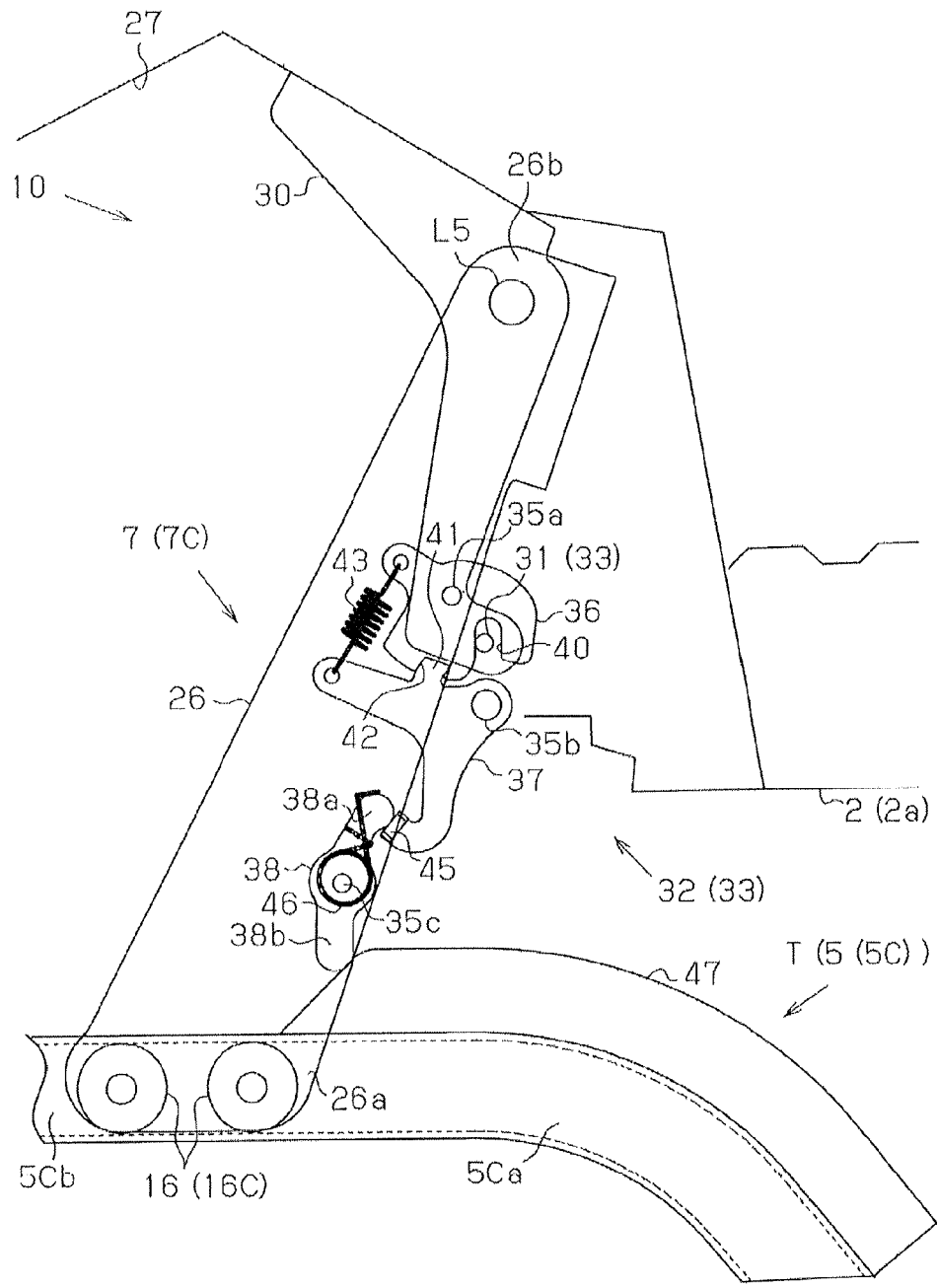
FIG. 7 is a plan view schematically illustrating the configuration of the rotation restriction mechanism in an engagement state of the striker and the latch mechanism according to the first embodiment.

As illustrated in FIGS. 5 to 7, a base bracket 30 is provided at the recess portion 27 formed at the side surface 2a of the vehicle body 2. A base portion 26b of the support arm 26 of the body-side connection member 7C is rotatably supported by the base bracket 30.

A striker 31 in a bar form is provided at the base bracket 30 to extend in the vertical direction (i.e., a direction orthogonal to a plane of paper in which FIG. 5 is illustrated). A latch mechanism 32 engageable with the striker 31 is provided at the support arm 26.

In the first embodiment, the rotation of the support arm 26 of the body-side connection member 7C allows the displacement of the slide door 4 in the width direction of the vehicle 1 during the opening and closing operation of the slide door 4. Specifically, in a state where the slide door 4 is in the fully closed position as illustrated in FIG. 5, the support arm 26 is arranged so that the end portion 26a thereof faces the substantially front side of the vehicle 1, i.e., a left side in FIG. 5. In addition, in the opening operation of the slide door 4 as illustrated in FIGS. 6 and 7, the support arm 26 rotates in a direction where the end portion 26a moves towards the outer side in the width direction (i.e., lower side in FIGS. 6 and 7) and the rear side of the vehicle 1 (i.e., right side in FIGS. 6 and 7) based on the rearward movement of the slide door 4. That is, the support arm 26 rotates in a counterclockwise direction in FIGS. 6 and 7. In the closing operation of the slide door 4, the support arm 26 rotates in an opposite direction (i.e., in a clockwise direction in FIGS. 6 and 7) from the direction in which the support arm 26 rotates in the opening operation of the slide door 4 so that the end portion 26a of the support arm 26 again faces substantially the front side of the vehicle 1 based on the forward movement of the slide door 4.

The striker 31 is provided at the rear side of the support arm 26 so that the latch mechanism 32 provided at the support arm 26 engages or disengages relative to the striker 31, i.e., makes close to or separates from the striker 31, based on the rotation of the support arm 26. In the present embodiment, a rotation restriction mechanism 33 is formed to restrict the support arm 26 from rotating, based on the engagement relationship between the striker 31 and the latch mechanism 32, at a position at which the support arm 26 is positioned after rotating in association with the opening operation of the slide door 4.

Specifically, as illustrated in FIG. 5, a bracket 34 is fixed to the support arm 26 to form three support shafts 35a, 35b, and 35c extending in the vertical direction (i.e., the direction orthogonal to the plane of paper in which FIG. 5 is illustrated). The latch mechanism 32 of the present embodiment includes a latch 36, a pole 37, and a control lever 38 pivotally supported by the support shafts 35a, 35b, and 35c, respectively.

In the latch mechanism 32, the latch 36 is pivotally supported by the support shaft 35a provided at the closest position, among the support shafts 35a, 35b, and 35c, to the base portion 26b of the support arm 26. The pole 37 is pivotally supported by the support shaft 35b so as to be arranged adjacent to the latch 36. The control lever 38 serving as a lever member is pivotally supported by the support shaft 35c provided close to the end portion 26a of the support arm 26 so as to be arranged adjacent to the pole 37.

The latch 36 includes an opening portion at a peripheral surface. Specifically, the latch 36 includes a first engagement portion 40 in a groove form engageable with the striker 31. The latch 36 also includes a second engagement portion 42 at the peripheral surface. The second engagement portion 42 is engageable with an engagement projection 41 formed at an outer peripheral surface of the pole 37. The latch 36 and the pole 37 are connected to each other via a coil spring 43. The latch 36 is biased by the coil spring 43 in the counterclockwise direction in FIG. 5 while the pole 37 is biased in the clockwise direction in FIG. 5.

The control lever 38 includes a first lever portion 38a facing a contact portion 45 formed at the pole 37. The control lever 38 is configured so that the first lever portion 38a makes contact with the contact portion 45a based on a biasing force of a torsion coil spring 46 that is fitted to the support shaft 35c. Accordingly, the pole 37 and the control lever 38 are configured to rotate in conjunction with each other.

A guide flange 47 serving as a guide member is formed at the curved portion 5Ca provided at a rear end portion of the door-side guide rail 5C to extend inwardly in the width direction. The control lever 38 also includes a second lever portion 38b that is slidably in contact with the guide flange 47.

The control lever 38 rotates while being guided by the guide flange 47 in a curved form with which the second lever portion 38b of the control lever 38 is slidably in contact. Then, in association with the rotation of the control lever 38, the pole 37 rotates so that the engagement and disengagement between the latch 36, specifically, the second engagement portion 42, and the pole 37, specifically, the engagement projection 41, are controlled.

Next, operations of the rotation restriction mechanism 33 of the first embodiment will be explained. As illustrated in FIG. 6, the support arm 26 rotates on a basis of the opening operation of the slide door 4 so that the striker 31 makes contact with the peripheral surface of the latch 36 that constitutes the latch mechanism 32. In a case where the support arm 26 further rotates in a state where the striker 31 is pressed against the peripheral surface of the latch 36, the latch 36 rotates in the clockwise direction in FIG. 6 against the elastic force of the coil spring 43. As a result, the striker 31 is positioned within the first engagement portion 40 in a groove form opening at the peripheral surface of the latch 36.

At this time, the second engagement portion 42 formed at the peripheral surface of the latch 36 is positioned to face the engagement projection 41 formed at the peripheral surface of the pole 37. That is, the engagement projection 41 and the second engagement portion 42 are brought in a positional relationship to be engageable with each other by the rotation of the pole 37 in the clockwise direction in FIG. 6 based on the elastic force of the coil spring 43 that is extended by the rotation of the latch 36.

Nevertheless, at this time, the control lever 38 is restricted from rotating in the counterclockwise direction in FIG. 6 by the guide flange 47 that is slidably in contact with the second lever portion 38b. Therefore, the pole 37 that rotates in association with the rotation of the control lever 38 is inhibited from rotating in the direction to engage with the latch 36. As a result, in the state illustrated in FIG. 6, the engagement between the striker 31 and the latch mechanism 32 is inhibited from being established.

Afterwards, in a case where the slide door 4 further moves rearward as illustrated in FIG. 7, the third guide rollers 16C provided at the end portion 26a of the support arm 26 are connected to a linear portion 5Cb of the door-side guide rail 5C.

That is, because the guide flange 47 with which the second lever portion 38b of the control lever 38 is in slidable contact is not formed any more as illustrated in FIG. 7, i.e., not formed at the linear portion 5Cb, the pole 37 is allowed to rotate, in conjunction with the control lever 38, on a basis of the elastic force of the coil spring 43. Then, because of the rotation of the pole 37, the engagement projection 41 formed at the peripheral surface of the pole 37 engages with the second engagement portion 42 formed at the peripheral surface of the latch 36, thereby restricting the rotation of the latch 36.

That is, the engagement between the striker 31 and the latch mechanism 32 is established by the state in which the striker 31 is inhibited from disengaging from the first engagement portion 40 of the latch 36. The aforementioned engagement state, including a state where the slide door 4 is held at the fully open position, is maintained until the second lever portion 38b of the control lever 38 is again brought to a state to make slidable contact with the guide flange 47 by the closing operation of the slide door 4.

In a state where the second lever portion 38b is in slidable contact with the guide flange 47, the control lever 38 is guided by the guide flange 47 to rotate in the clockwise direction in FIG. 7 in association with the forward movement of the slide door 4. Then, in conjunction with the rotation of the control lever 38, the pole 37 rotates in the counterclockwise direction in FIG. 7 to release the engagement between the pole 37 and the latch 36.

According to the rotation restriction mechanism 33 of the present embodiment, the latch mechanism 32 provided at the support arm 26 and the striker 31 provided at the vehicle body 2 engage with each other in a state where the support arm 26 is at the position at which the support arm 26 is positioned after rotating in association with the opening operation of the slide door 4. The rotation (i.e., further rotation) of the support arm 26 is restricted to thereby improve a support rigidity of the slide door 4, which may result in quality increase.

According to the first embodiment, the following effects may be obtained.

(1) The slide door apparatus 10 includes the door-side guide rail 5C provided at the inner side surface 4a of the slide door 4, and the body-side connection member 7C connected to the door-side guide rail 5C. The body-side connection member 7C includes the third guide rollers 16C at the end portion 26a of the support arm 26 that is rotatably connected to the vehicle body 2, each of the third guide rollers 16C being configured to roll on the path T formed by the door-side guide rail 5C. Then, the slide door apparatus 10 includes the rotation restriction mechanism 33 configured to restrict the rotation of the support arm 26 at the position at which the support arm 26 is positioned after rotating in association with the opening operation of the slide door 4.

Figure 8:
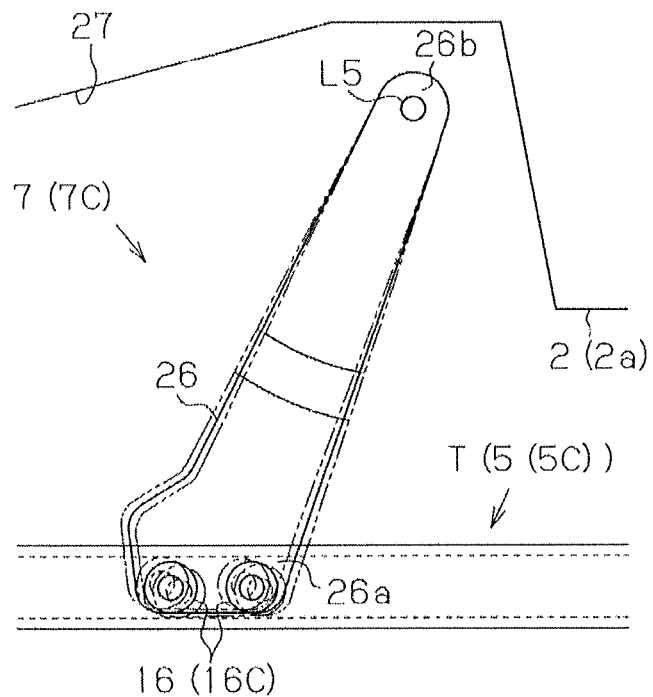
FIG. 8 is a plan view explaining a state in which a small rotation or movement occurs at a support arm at a position at which the support arm is positioned after rotating in association with an opening operation of the slide door according to the first embodiment.

In order for each of the guide rollers 16 to smoothly roll on the path T formed by each of the guide rails 5, a clearance needs to be specified and formed between the guide rail 5 and the guide roller 16. Nevertheless, because of such clearance formed as illustrated in FIG. 8, the support arm 26 may slightly rotate even after the support arm 26 completes its rotation based on the displacement of the slide door 4 in the vehicle width direction at the time of the opening operation of the slide door 4. In a configuration in which the guide rail 5 is provided at the slide door 4, (i.e., the door-side guide rail 5C), a small rotation or movement generated at the support arm 26 of the body-side connection member 7C tends to become noticeable as swing or shaky movement of the slide door 4.

Nevertheless, because the rotation of the support arm 26 is restricted according to the aforementioned configuration, the support rigidity of the slide door 4 is enhanced. As a result, the swing or shaky movement of the slide door 4 is restrained so as to improve a quality feeling thereof.

(2) The rotation restriction mechanism 33 includes the latch mechanism 32 and the striker 31 which are connected or disconnected on a basis of the rotation of the support arm 26. The latch mechanism 32 and the striker 31 engage with each other in a state where the support arm 26 is at the position at which the support arm 26 is positioned after rotating in association with the opening operation of the slide door 4, thereby restricting the rotation of the support arm 26.

Accordingly, the support arm 26 may be securely restricted from rotating by the engagement between the latch mechanism 32 and the striker 31 at the position at which the support arm 26 is positioned after rotating in association with the opening operation of the slide door 4.

(3) The latch mechanism 32 includes the latch 36 rotatably provided and including the first engagement portion 40 engageable with the striker 31, and the pole 37 configured to engage with the second engagement portion 42 formed at the latch 36 for holding the engagement between the striker 31 and the latch 36. The latch mechanism 32 further includes the control lever 38 rotating in conjunction with the pole 37 to control the engagement projection 41 of the pole 37 to engage or disengage relative to the second engagement portion 42 of the latch 36.

Accordingly, the rotation of the support arm 26 may be securely restricted by the engagement between the striker 31 and the latch 36. The engagement and disengagement between the striker 31 and the latch 36 may be appropriately controlled on a basis of the operation of the control lever 38.

(4) The guide flange 47 extending inwardly in the vehicle width direction is formed at the curved portion 5Ca of the door-side guide rail 5C. The control lever 38 includes the second lever portion 38b slidably in contact with the guide flange 47. The control lever 38 rotates by being guided by the guide flange 47 in the curved form and in slidable contact with the second lever portion 38b.

That is, during the opening and closing operation, the slide door 4 is displaced in the vehicle width direction based on the curved form of each of the guide rails 5. Thus, without an electrical configuration, for example, a sensor or an actuator, the engagement and disengagement between the latch 36 and the pole 37 may be appropriately and securely controlled. The high reliability of the slide door 4 may be obtained accordingly.

(5) The rotation restriction mechanism 33 is configured to restrict the rotation of the support arm 26 in a state where the slide door 4 is held at the fully open position. Accordingly, at the fully open position at which the slide door 4 is stopped and thus the swing or shaky movement of the slide door 4 is noticeable, the aforementioned configuration may be further effective.

(6) The slide door apparatus 10 includes the first body-side guide rail 5A provided in the rear of the door opening portion 3, the second body-side guide rail 5B provided at the lower edge 3a of the door opening portion 3, and the door-side guide rail 5C arranged at the lower side of the second body-side guide rail 5B for supporting the slide door 4 at the vehicle body 2.

According to the aforementioned configurations, as illustrated in FIG. 1, the slide door 4 is supported by three connection points, specifically, a connection point Pa (Pa') between the first body-side guide rail 5A and the first door-side connection member 7A, a connection point Pb (Pb') between the second body-side guide rail 5B and the second door-side connection member 7B, and a connection point Pc (Pc') between the door-side guide rail 5C and the body-side connection member 7C. The connection points Pa, Pb, and Pc are obtained in a case where the slide door 4 is in the substantially fully closed position. The connection points Pa', Pb' and Pc' are obtained in a case where the slide door 4 is in the substantially fully open position. The size of triangle formed by the connection points Pa, Pb, and Pc decreases by the opening operation of the slide door 4. That is, because of the rearward movement of the slide door 4, the connection points Pb and Pc arranged at the lower side in the slide door 4 come closer to each other, which results in the connection points Pb' and Pc'. Accordingly, the slide door 4 may easily swing or move about a line (straight line) N' connecting the connection points Pa' and Pb'. Consequently, the application of the aforementioned configurations (1) to (5) to the slide door apparatus 10 including such support structure may be further effective.

(7) The first door-side connection member 7A connected to the first body-side guide rail 5A is provided at a position corresponding to the lower edge 11a of the window portion 11 formed by the slide door 4. As a result, a load applied to a portion constituting the window frame of the window portion 11 may be reduced. A design flexibility of the window frame portion may greatly increase, including elimination of the window frame portion. Nevertheless, such layout of the first door-side connection member 7A may not be appropriate for stably supporting the slide door 4. Consequently, the application of the aforementioned configurations (1) to (5) to the slide door apparatus 10 including such support structure may be further effective.

A second embodiment will be explained with reference to the attached drawings. The similar members and configurations of the second embodiment to those of the first embodiment bear the same reference numerals and explanation will be omitted.

Figure 9:
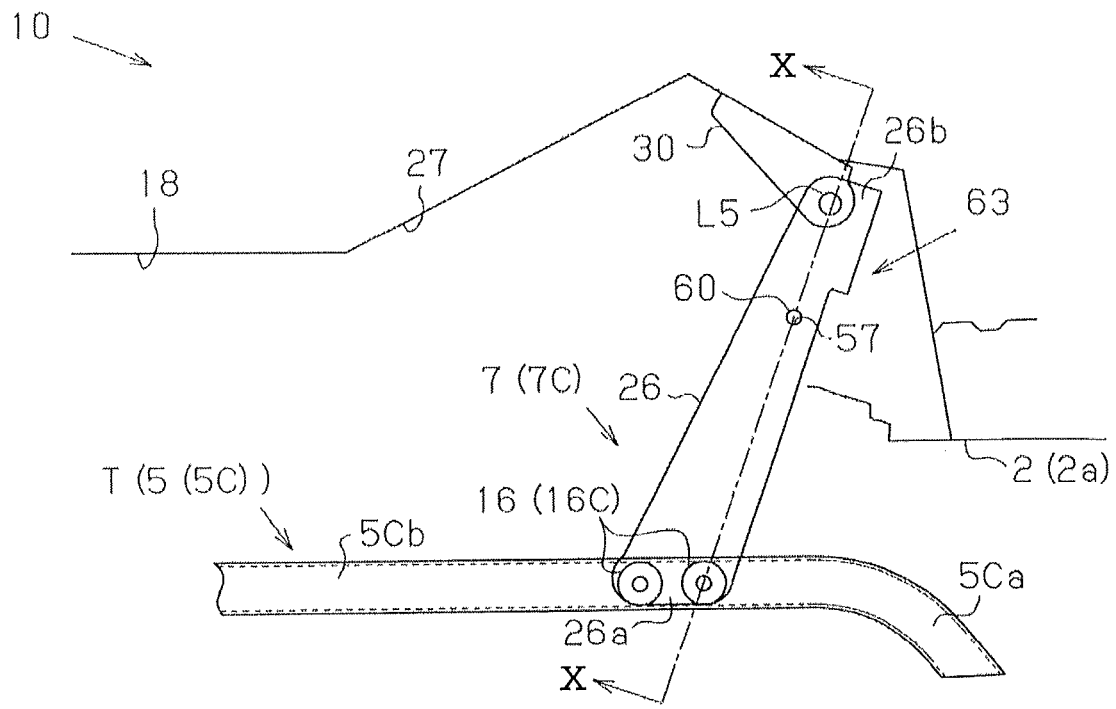
FIG. 9 is a plan view illustrating a configuration of a rotation restriction mechanism according to a second embodiment disclosed here.
Figure 10:
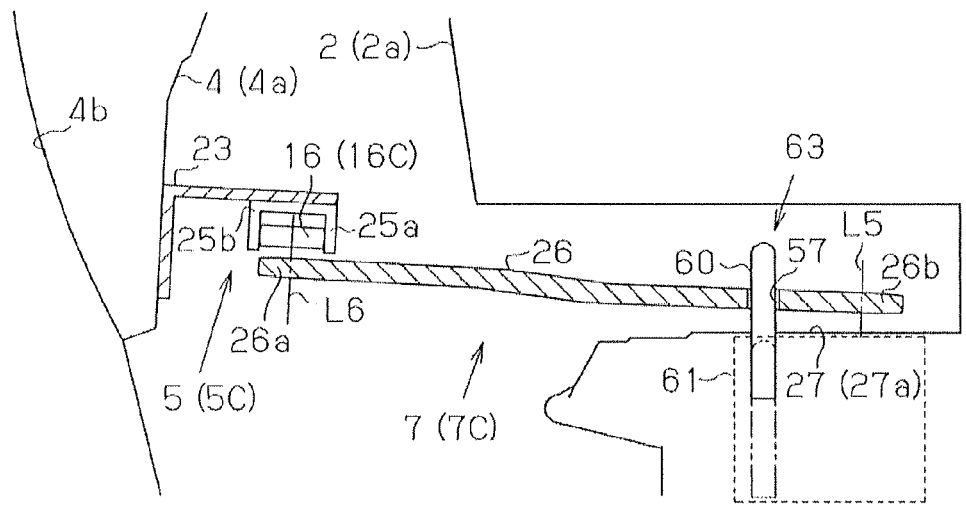
FIG. 10 is a cross-sectional view taken along line X-X in FIG. 9 illustrating the configuration of the rotation restriction mechanism.

As illustrated in FIGS. 9 and 10, in the second embodiment, a penetration bore 57 penetrating through the support arm 26 in the vertical direction is formed at the support arm 26 constituting the body-side connection member 7C. In addition, an engagement member 60 in a shaft form movable in the vertical direction along an axis thereof, and an engagement member drive unit 61 driving the engagement member 60 are provided at the vehicle body 2 at which the base portion 26b of the support arm 26 is rotatably supported. In the second embodiment, the engagement member 60 is inserted to be positioned within the penetration bore 57 of the support arm 26 in a state where the support arm 26 is at the position at which the support arm 26 is positioned after rotating in association with the opening operation of the slide door 4. As a result, a rotation restriction mechanism 63 is configured to restrict the rotation of the support arm 26 based on the engagement relationship between the engagement member 60 and the penetration bore 57.

Figure 11:
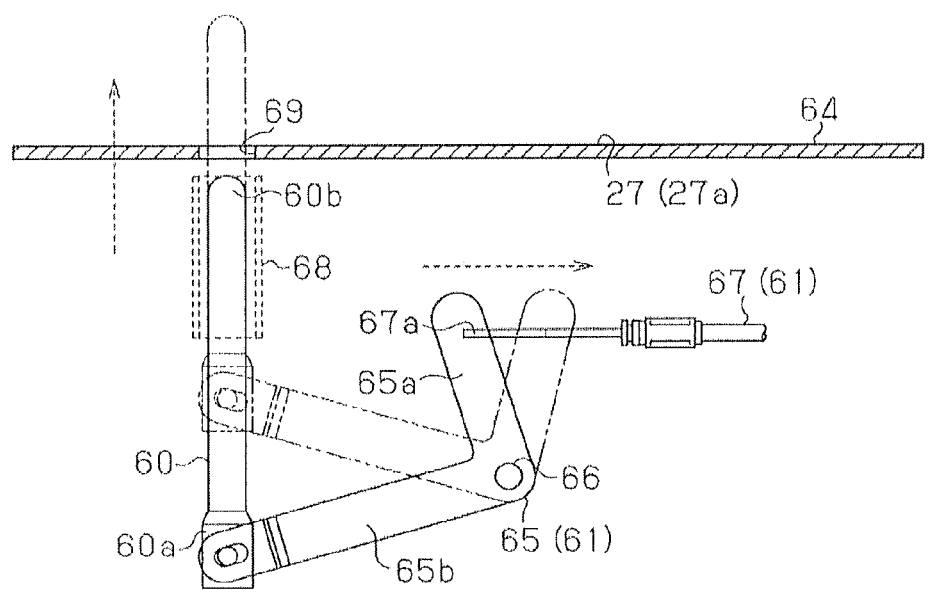
FIG. 11 is a side view of a drive lever constituting a driving portion of an engagement member drive unit according to the second embodiment.

Specifically, as illustrated in FIG. 11, a drive lever 65 serving as a driving portion is provided at a lower side of a panel member 64 constituting a lower surface 27a of the recess portion 27. The drive lever 65 is pivotally supported by a support shaft 66 substantially in parallel with the lower surface 27a.

The drive lever 65 includes a first lever portion 65a and a second lever portion 65b to form a substantially L-shape with the support shaft 66 serving as a base end. The drive lever 65 is pivotally supported by the support shaft 66 in a state where the first lever portion 65a is positioned at an upper side of the support shaft 66. A first end portion 67a of a wire cable 67 serving as a transmission member is connected to an end of the first lever portion 65a. A base end 60a of the engagement member 60 is connected to an end of the second lever portion 65b arranged substantially orthogonal to the first lever portion 65a.

A guide member 68 in a cylindrical form extending in the vertical direction is provided at a lower side of the panel member 64. A tip end 60b of the engagement member 60 is inserted to be positioned within the cylindrical guide member 68. An insertion bore 69 is formed at the panel member 64 at a position facing the guide member 68 so that the engagement member 60 is insertable into the insertion bore 69.

Specifically, the engagement member 60 of the second embodiment moves in the vertical direction by being guided by the guide member 68 so that the tip end 60b is projectable from the lower surface 27a of the recess portion 27 via the insertion bore 69 formed at the panel member 64. The drive lever 65 is pulled by the wire cable 67 that is connected to the first lever portion 65a so that the second lever portion 65b connected to the base end 60a of the engagement member 60 rotates to be lifted up, i.e., rotates in the clockwise direction in FIG. 11. Then, the tip end 60b of the engagement member 60 projects upward from the panel member 64.

Figure 12:
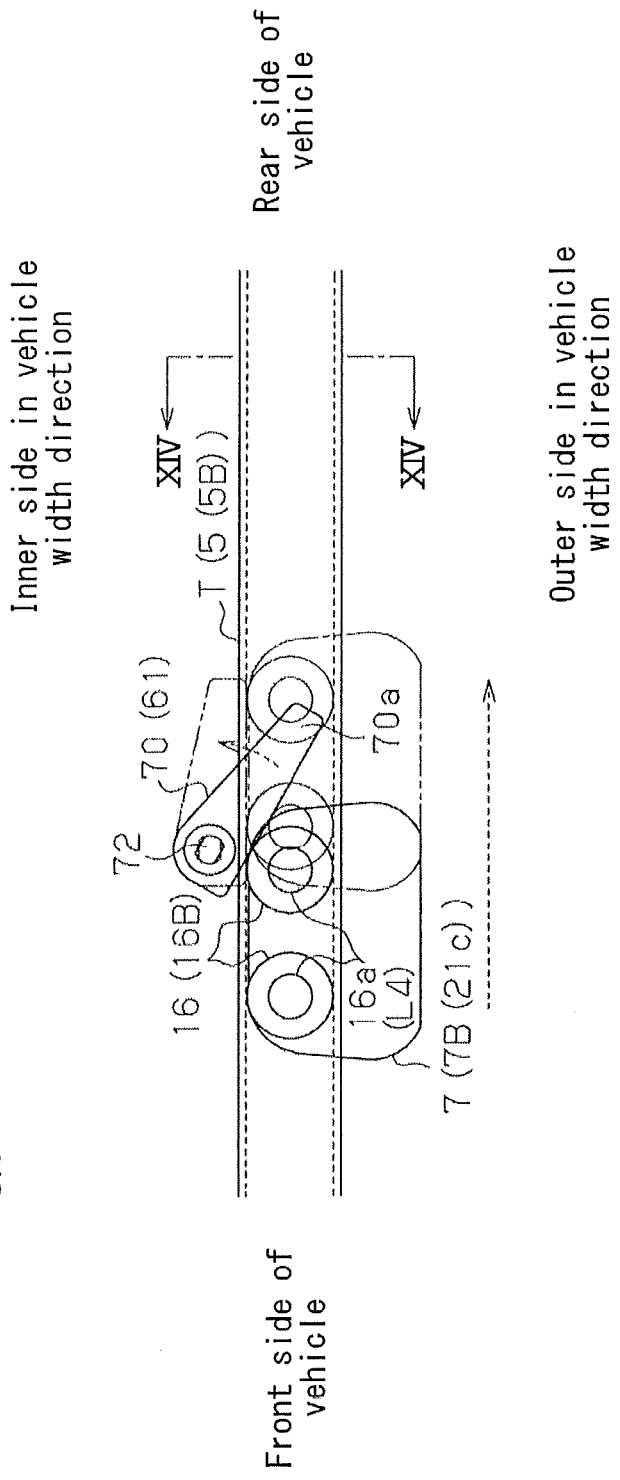
FIG. 12 is a plan view of a pressure-receiving lever constituting a pressure-receiving portion of the engagement member drive unit according to the second embodiment.

As illustrated in FIG. 12, a pressure-receiving lever 70 serving as a pressure-receiving portion is provided at the second body-side guide rail 5B (see FIG. 4A) that is provided at the lower edge 3a of the door opening portion 3. The pressure-receiving lever 70 is pressed against the second door-side connection member 7B connected to the second body-side guide rail 5B in association with the opening operation of the slide door 4.

Figure 13:
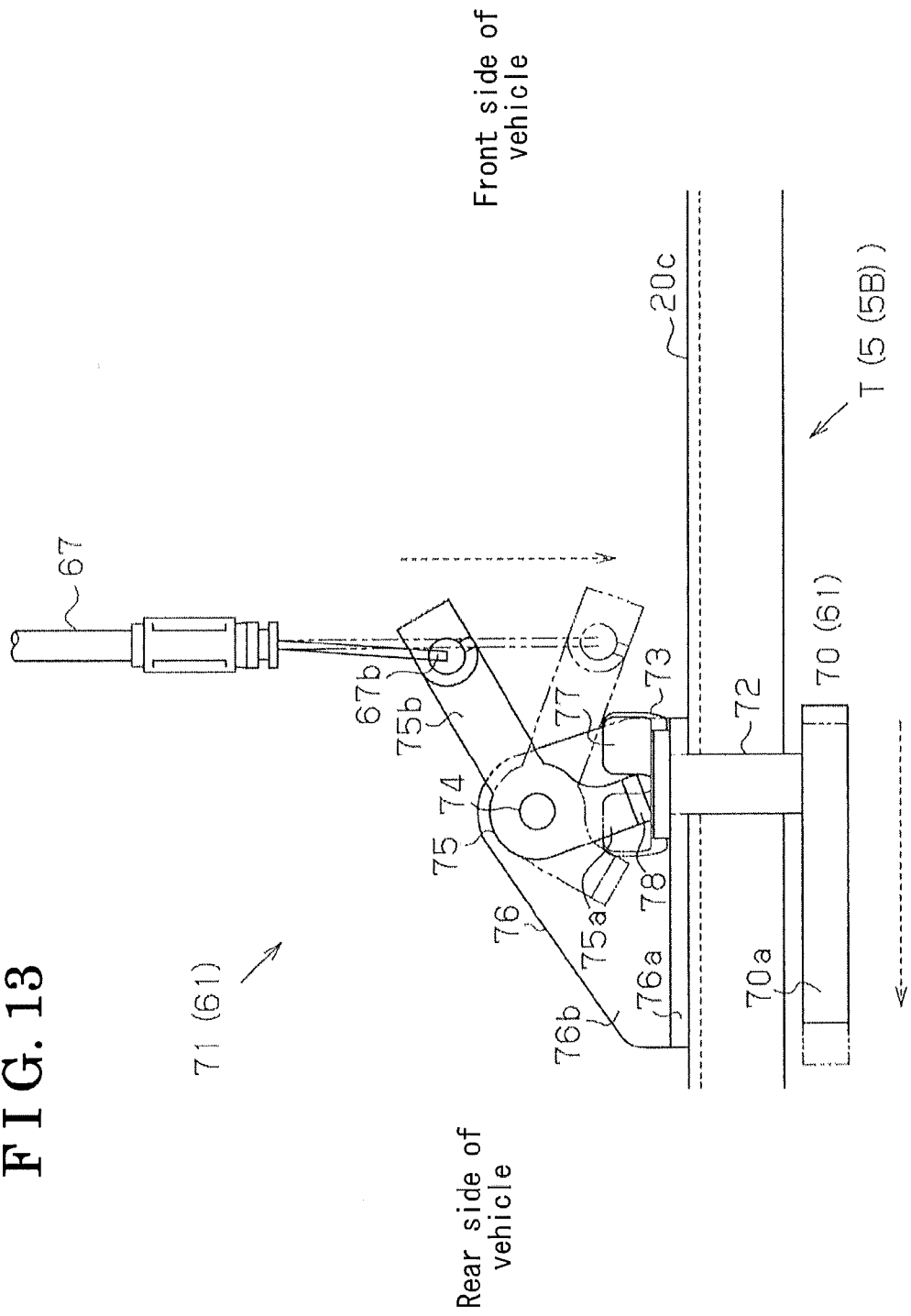
FIG. 13 is a side view of a conversion mechanism constituting the engagement member drive unit according to the second embodiment.
Figure 14:
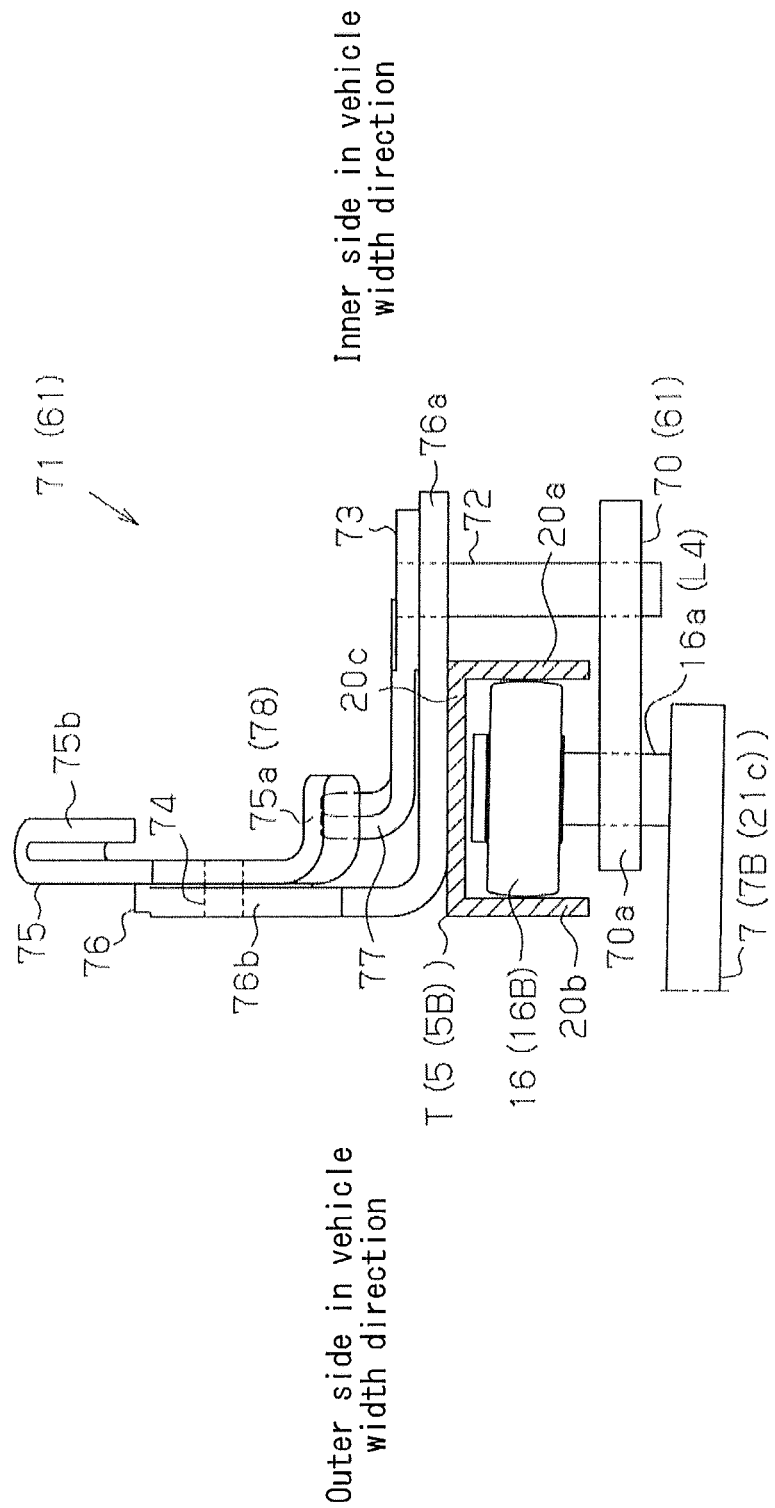
FIG. 14 is cross-sectional view taken along line XIV-XIV in FIG. 12 illustrating a configuration of the conversion mechanism constituting the engagement member drive unit.

Further, as illustrated in FIGS. 13 and 14, a first conversion lever 73 and a second conversion lever 75 are provided at the second body-side guide rail 5B. The first conversion lever 73 includes a rotation shaft 72 that is also serves as a rotation shaft of the pressure-receiving lever 70 so that the first conversion lever 73 integrally rotates with the pressure-receiving lever 70. The second conversion lever 75 is rotatable about a support shaft 74 that is substantially orthogonal to the rotation shaft 72. In the second embodiment, the first conversion lever 73 and the second conversion lever 75 constitute a conversion mechanism 71 for converting a pressing force generated by the second door-side connection member 7B moving on the second body-side guide rail 5B against the pressure-receiving lever 70 (i.e., a force by which the pressure-receiving lever 70 is pressed) during the opening operation of the slide door 4 to a tensile force of the wire cable 67 connected to the drive lever 65.

A support bracket 76 including a substantially L-shape cross section is provided upon an upper wall portion 20c of the second body-side guide rail 5B including a substantially U-shape cross section opening downward. The support bracket 76 is positioned in the rear of the curved portion 5Ba that is formed at the front side, i.e., positioned at a linear portion 5Bb in FIG. 4A. The rotation shaft 72 of the pressure-receiving lever 70 and the first conversion lever 73, and the support shaft 74 of the second conversion lever 75 are provided at the support bracket 76.

Specifically, the rotation shaft 72 of the pressure-receiving lever 70 and the first conversion lever 73 is formed to penetrate in the vertical direction through a lateral portion 76a of the support bracket 76. The lateral portion 76a extends to the lateral side of the second body-side guide rail 5B, i.e., extends inwardly in the vehicle width direction (right side in FIG. 14). The support shaft 74 of the second conversion lever 75 is formed at a vertical portion 76b of the support bracket 76 extending upwardly from the second body-side guide rail 5B.

The pressure-receiving lever 70 is fixed to a lower end portion of the rotation shaft 72 in a state where an end 70a of the pressure-receiving lever 70 is positioned to be contactable with the roller holding portion 21c provided at an end portion of the second door-side connection member 7B, specifically, contactable with a support shaft 16a (i.e., the support axis L4) of the second guide roller 16B. In addition, the first conversion lever 73 is fixed to an upper end portion of the rotation shaft 72 in a state to be positioned at an upper side of the support bracket 76. A bending portion 77 bending upwardly in FIG. 14 is formed at an end of the first conversion lever 73.

The second conversion lever 75 includes a first lever portion 75a and a second lever portion 75b forming substantially an L-shape with the support shaft 74 serving as a base end. The second conversion lever 75 is pivotally supported by the support shaft 74 in a state where an end of the first lever portion 75a is positioned at a lower side of the support shaft 74. A bending portion 78 is formed at the end of the first lever portion 75a so as to bend in a direction orthogonal to the vertical portion 76b of the support bracket 76.

The first conversion lever 73 and the second conversion lever 75 are biased in a direction in which the bending portions 77 and 78 make contact with each other by an elastic force of a biasing member, for example, a torsion coil spring. Accordingly, the first conversion lever 73 and the second conversion lever 75 are configured to rotate in conjunction with each other.

The second lever portion 75b of the second conversion lever 75 extends in a direction substantially orthogonal to a direction in which the first lever portion 75a extends. In addition, a second end portion 67b of the wire cable 67 that is connected to the first lever portion 65a of the drive lever 65 is connected to an end of the second lever portion 75b.

The second door-side connection member 7B connected to the second body-side guide rail 5B moves upon the second body-side guide rail 5B based on the opening operation of the slide door 4. At this time, the pressure-receiving lever 70 serving as the pressure-receiving portion rotates by contacting with and pressed against the roller holding portion 21c of the second door-side connection member 7B that moves relative to the second body-side guide rail 5B.

The first conversion lever 73 integrally rotates with the pressure-receiving lever 70 to thereby rotate the second conversion lever 75. In addition, the rotation of the second conversion lever 75 causes the second end portion 67b of the wire cable 67 connected to the second lever portion 75b to be pulled down. As a result, the conversion mechanism 71 in the second embodiment may convert the pressing force generated by the second door-side connection member 7B against the pressure-receiving lever 70 to the tensile force of the wire cable 67.

In the second embodiment, the pressure-receiving lever 70, and the first and second conversion levers 73 and 75 constituting the conversion mechanism 71 are provided at the linear portion 5B*b* arranged in the rear of the curved portion 5B*a* that is formed at the front end of the second body-side guide rail 5B. Thus, at a time when the pressure-receiving lever 70 is pressed against the second door-side connection member 7B, the rotation of the support arm 26 of the body-side connection member 7C based on the opening operation of the slide door 4 has been already completed. The drive lever 65 drives the engagement member 60 based on the tensile force of the wire cable 67 so that the tip end 60*b* of the engagement member 60 is inserted to be positioned within the penetration bore 57 formed at the support arm 26.

Accordingly, in the second embodiment, the drive lever 65 serving as the drive portion and the pressure-receiving lever 70 serving as the pressure-receiving portion are connected to each other by the conversion mechanism 71 and the wire cable 67 serving as the transmission portion to constitute the engagement member drive unit 61 driving the engagement member 60 provided at the vehicle body 2 to be inserted to engage with the penetration bore 57 at the support arm 26. The rotation restriction mechanism 63 of the second embodiment is configured to restrict the support arm 26 from rotating at the position at which the support arm 26 is positioned after rotating in association with the opening operation of the slide door 4 by the engagement between the penetration bore 57 serving as an engagement portion and the engagement member 60.

Accordingly, the rotation restriction mechanism 63 of the second embodiment is configured to restrict the support arm 26 from rotating at the position at which the support arm 26 is positioned after rotating in association with the opening operation of the slide door 4, in the similar manner to the rotation restriction mechanism 33 of the first embodiment. That is, the support arm 26 may be securely restricted from rotating, by the engagement between the penetration bore 57 (the engagement portion) and the engagement member 60, at the position at which the support arm 26 is positioned after rotating in association with the opening operation of the slide door 4. As a result, the support rigidity of the slide door 4 is enhanced to improve quality feeling thereof while the swing or shaky movement of the slide door 4 is restrained.

The engagement member 60 is driven on a basis of the pressing force of the second door-side connection member 7B against the pressure-receiving lever 70, the second door-side connection member 7B moving relative to the second body-side guide rail 5B at the time of the opening and closing operation of the slide door 4. Thus, without an electrical structure, for example, a sensor or an actuator, the rotation of the support arm 26 may be appropriately and securely restricted or permitted. The high reliability may be secured accordingly.

Further, the engagement member 60 is configured to project and retract relative to the lower surface 27*a* of the recess portion 27 (i.e., a surface) facing the penetration bore 57 formed at the support arm 26. Thus, interference between the engagement member 60 and the support arm 26 in the disengagement state thereof may be inhibited. In addition, design property may improve.

The aforementioned embodiments may be modified as follows. Specifically, in the first and second embodiments, the slide door apparatus 10 includes the first body-side guide rail 5A provided at the rear side of the door opening portion 3, the second body-side guide rail 5B provided at the lower edge 3*a* of the door opening portion 3, and the door-side guide rail 5C arranged at the lower side of the second body-side guide rail 5B for supporting the slide door 4. At this time, the numbers and arrangements of the guide rails 5 and the connection members 7 may be appropriately changed. That is, the slide door apparatus 10 includes the door-side guide rail 5C and the body-side connection member 7C. The body-side connection member 7C is configured so that the third guide roller 16C rolling on the path T formed by the door-side guide rail 5C is provided at the end portion 26*a* of the support arm 26 that is rotatably connected relative to the vehicle body 2. At this time, for example, the first door-side connection member 7A connected to the first body-side guide rail 5A may be provided at a position corresponding to an upper edge of the window portion 11.

The position at which the support arm 26 is positioned after rotating in association with the opening operation of the slide door 4 used for the restriction of the rotation of the support arm 26 may be appropriately specified within a range in which the smooth opening and closing operation of the slide door 4 is secured. For example, in the first embodiment, the position of the striker 31 may be adjusted. In the second embodiment, the arrangement of the pressure-receiving lever 70 may be adjusted.

In the first embodiment, the rotation restriction mechanism 33 includes the striker 31 provided at the base bracket 30 supporting the support arm 26 at the vehicle body 2, and the latch mechanism 32 provided at the support arm 26. Alternatively, the striker 31 may be directly provided at the vehicle body 2. As illustrated in FIG. 15, the latch mechanism 32 may be provided at the vehicle body 2 while the striker 31 may be provided at the support arm 26.

In the first embodiment, the latch mechanism 32 includes the control lever 38 rotating in conjunction with the pole 37. The rotation of the control lever 38 in conjunction with the pole 37 is restricted depending on a slidable contact state relative to the guide flange 47 formed at the curved portion 5C*a* of the door-side guide rail 5C. Alternatively, the control lever 38 may rotate on a basis of power of a drive source.

In the second embodiment, the engagement member 60 in a shaft form is provided at the vehicle body 2 to project and retract relative to the lower surface 27*a* of the recess portion 27 that faces the support arm 26. The penetration bore 57 serving as the engagement portion relative to the engagement member 60 is formed at the support arm 26. At this time, configurations of the engagement member 60 and the engagement portion (the penetration bore 57) may be appropriately changed. For example, a projection serving as the engagement portion may be provided at the support arm 26 and an engagement recess portion engaging with the projection may be provided at the engagement member 60. Alternatively, two projections may engage with each other.

The operation manner of the engagement member 60 may be appropriately changed. For example, the engagement member 60 may rotate to engage with the engagement portion formed at the support arm 26. The engagement member 60 may not be necessarily configured to project and retract relative to the surface facing the support arm 26.

In the second embodiment, the engagement member drive unit 61 includes the pressure-receiving lever 70 making contact with and pressed against the second door-side connection member 7B moving on the second body-side guide rail 5B. Then, the pressing force generated by the second door-side connection member 7B against the pressure-receiving lever 70 is converted to the tensile force of the wire cable 67 so that the tensile force is transmitted to the drive lever 65 to drive the engagement member 60. Alternatively, the transmission member other than the wire cable 67, for example, a link or a rod, may be used. The pressure-receiving lever 70 may be provided at the other guide rail than the second body-side guide rail 5B. The configurations of the drive lever 65, the pressure-receiving lever 70, and the conversion mechanism 71 may be appropriately changed.

As illustrated in FIG. 16, an engagement member drive unit 81 including a drive source for driving the drive lever 65 may be provided. Specifically, the engagement member drive unit 81 includes a solenoid 82 serving as the drive source, a control unit 83 controlling the operation of the solenoid 82, and a position sensor 84 detecting the position of the support arm 26 after the rotation thereof based on the opening operation of the slide door 4. At this time, an electric motor may be used for the drive source. Based on a detection result of the position sensor 84, the operation of the drive lever 65 may be controlled. As a result, the same effects as those of the second embodiment may be obtained, in addition to a simplification of configurations.

According to the aforementioned embodiments, the rotation restriction mechanism 33 includes the striker 31 provided at the vehicle body 2 and the latch mechanism 32 provided at the support arm 26, the latch mechanism 32 engaging with the striker 31 in a case where the support arm 26 is at the position at which the support arm 26 is positioned after rotating in association with the opening operation of the slide door 4.

In addition, the rotation restriction mechanism 33 includes the striker 31 provided at the support arm 26 and the latch mechanism 32 provided at the vehicle body 2, the latch mechanism 32 engaging with the striker 31 in a case where the support arm 26 is at the position at which the support arm 26 is positioned after rotating in association with the opening operation of the slide door 4.

Further, the engagement member drive unit 81 includes the position sensor 84 detecting the support arm 26 arranged at the position at which the support arm 26 is positioned after rotating in association with the opening operation of the slide door 4 and the drive lever 65 (driving portion) driving the engagement member 60 based on the detection result of the position sensor 84. As a result, the configurations of the slide door apparatus 10 may be simplified.

In the first embodiment, the rotation restriction mechanism 33 includes the latch mechanism 32 and the striker 31 engaging and disengaging relative to each other on a basis of the rotation of the support arm 26, the latch mechanism 32 and the striker 31 engaging with each other in a case where the support arm 26 is at the position at which the support arm 26 is positioned after rotating in association with the opening operation of the slide door 4 to restrict the rotation of the support arm 26.

In the first embodiment, the latch mechanism 32 includes the latch 36 being rotatable and including the first engagement portion 40 engageable with the striker 31, the latch 36 including the second engagement portion 42, the pole 37 engageable with the second engagement portion 42 of the latch 36 to maintain the engagement state between the striker 31 and the latch 36, and the control lever 38 rotating in conjunction with the pole 37 to cause the pole 37 to selectively engage and disengage relative to the second engagement portion 42 of the latch 36.

In the first embodiment, the slide door apparatus 10 further includes the guide flange 47 guiding the control lever 38 based on the curved form specified at each of the guide rails 5 to displace the slide door 4 in the width direction of the vehicle 1 based on the movement of the slide door 4 in the front-rear direction of the vehicle 1.

In the second embodiment, the rotation restriction mechanism 63 includes the penetration bore 57 provided at the support arm 26, the engagement member 60 provided at the vehicle body 2, and the engagement member drive unit 61, 81 driving the engagement member 60 to engage with the penetration bore 57.

In the second embodiment, the engagement member drive unit 61 includes the pressure-receiving lever 70 contacting with and pressed against one of the connection members 7 (i.e., the second door-side connection member 7B) that is moving relative to the second body-side guide rail 5B on a basis of the opening operation of the slide door 4, and the drive lever 65 driving the engagement member 60 based on a force by which the pressure-receiving lever 70 is pressed.

In the second embodiment, the engagement member 60 is configured to project and retract relative to the surface formed at the vehicle body 2 (i.e., the lower surface 27a of the recess portion 27) and facing the penetration bore 57 of the support arm 26 in a state to be driven by the engagement member drive unit 61, 81.

In the first and second embodiments, the rotation restriction mechanism 33, 63 is configured to restrict the rotation of the support arm 26 in a state where the slide door 4 is held at the fully open position.

In the first and second embodiments, the body-side guide rail includes the first body-side guide rail 5A provided at the rear side of the door opening portion 3 and the second body-side guide rail 5B provided at the lower edge 3a of the door opening portion 3, and the door-side guide rail 5C is arranged at the lower side of the second body-side guide rail 5B, the first body-side guide rail 5A, the second body-side guide rail 5B, and the door-side guide rail 5C supporting the slide door 4.

In the first and second embodiments, one of the connection members 7 connected to the first body-side guide rail 5A, i.e., the first door-side connection member 7A, is arranged at the position corresponding to the lower edge 11a of the window portion 11 formed by the slide door 4.

In the first embodiment, the rotation restriction mechanism 33 includes the striker 31 provided at the vehicle body 2 and the latch mechanism 32 provided at the support arm 26, the latch mechanism 32 engaging with the striker 31 in a case where the support arm 26 is at the position at which the support arm 26 is positioned after rotating in association with the opening operation of the slide door 4.

In the first embodiment, the rotation restriction mechanism 33 includes the striker 31 provided at the support arm 26 and the latch mechanism 32 provided at the vehicle body 2, the latch mechanism 32 engaging with the striker 31 in a case where the support arm 26 is at the position at which the support arm 26 is positioned after rotating in association with the opening operation of the slide door 4.

In the second embodiment, the engagement member drive unit 81 includes the position sensor 84 detecting the support arm 26 arranged at the position at which the support arm 26 is positioned after rotating in association with the opening operation of the slide door 4 and the drive lever 65 driving the engagement member 60 based on a detection result of the position sensor 84.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A slide door apparatus for a vehicle, comprising:
   a body-side guide rail provided at a side surface of a vehicle body;
   a door-side guide rail provided at a slide door;
   connection members each of which includes a guide roller rolling on a path which is defined by each of the body-side guide rail and the door-side guide rail, each of the connection members being connected to each of the body-side guide rail and the door-side guide rail;
   the slide door being supported at the vehicle body via the body-side guide rail, the door-side guide rail, and the connection members, the slide door being configured to open and close a door opening portion which is provided at the side surface of the vehicle body by moving in a front-rear direction of a vehicle along each of the body-side guide rail and the door-side guide rail,
   one of the connection members being connected to the door-side guide rail and including a support arm which is rotatably connected to the vehicle body and at which the guide roller is provided, and
   a rotation restriction mechanism restricting the support arm from rotating at a position at which the support arm is positioned after the support arm rotates with an opening operation of the slide door.

2. The slide door apparatus according to claim 1, wherein the rotation restriction mechanism includes a latch mechanism and a striker engaging and disengaging relative to each other on a basis of a rotation of the support arm, the rotation of the support arm is restricted by an engagement between the latch mechanism and the striker at the position at which the support arm is positioned after the support arm rotates with the opening operation of the slide door.

3. The slide door apparatus according to claim 2, wherein the latch mechanism includes a latch being rotatable and including a first engagement portion engageable with the striker, the latch including a second engagement portion, a pole engageable with the second engagement portion of the latch to maintain an engagement state between the striker and the latch, and a lever member rotating in conjunction with the pole to cause the pole to selectively engage and disengage relative to the second engagement portion of the latch.

4. The slide door apparatus according to claim 3, further comprising a guide member guiding the lever member based on a curved form specified at each of the body-side guide rail and the door-side guide rail to displace the slide door in a width direction of the vehicle based on the movement of the slide door in the front-rear direction of the vehicle.

5. The slide door apparatus according to claim 1, wherein the rotation restriction mechanism includes an engagement portion provided at the support arm, an engagement member provided at the vehicle body, and an engagement member drive unit driving the engagement member to engage with the engagement portion.

6. The slide door apparatus according to claim 5, wherein the engagement member drive unit includes a pressure-receiving portion which makes contact with one of the connection members and which is pressed against the one of the connection members, the one of the connection members moving relative to the body-side guide rail with the opening operation of the slide door, and a driving portion driving the engagement member based on a force by which the pressure-receiving portion is pressed.

7. The slide door apparatus according to claim 5, wherein the engagement member is configured to project and retract relative to a surface formed at the vehicle body and facing the engagement portion of the support arm in a state to be driven by the engagement member drive unit.

8. The slide door apparatus according to claim 1, wherein the rotation restriction mechanism is configured to restrict the rotation of the support arm in a state where the slide door is held at a fully open position.

9. The slide door apparatus according to claim 1, wherein the body-side guide rail includes a first body-side guide rail provided at a rear side of the door opening portion and a second body-side guide rail provided at a lower edge of the door opening portion, and the door-side guide rail is arranged at a lower side of the second body-side guide rail, the first body-side guide rail, the second body-side guide rail, and the door-side guide rail supporting the slide door.

10. The slide door apparatus according to claim 9, wherein one of the connection members connected to the first body-side guide rail is arranged at a position corresponding to a lower edge of a window portion formed by the slide door.

11. The slide door apparatus according to claim 2, wherein the rotation restriction mechanism includes the striker provided at the vehicle body and the latch mechanism provided at the support arm, the latch mechanism engaging with the striker in a case where the support arm is at the position at which the support arm is positioned after rotating in association with the opening operation of the slide door.

12. The slide door apparatus according to claim 2, wherein the rotation restriction mechanism includes the striker provided at the support arm and the latch mechanism provided at the vehicle body, the latch mechanism engaging with the striker in a case where the support arm is at the position at which the support arm is positioned after rotating in association with the opening operation of the slide door.

13. The slide door apparatus according to claim 5, wherein the engagement member drive unit includes a position sensor detecting the support arm arranged at the position at which the support arm is positioned after rotating in association with the opening operation of the slide door and a driving portion driving the engagement member based on a detection result of the position sensor.

* * * * *